US010710922B2

(12) United States Patent
O'Connor et al.

(10) Patent No.: US 10,710,922 B2
(45) Date of Patent: Jul. 14, 2020

(54) METHODS AND APPARATUS FOR CUTTING A SUBSTRATE

(71) Applicant: National University of Ireland, Galway, Galway (IE)

(72) Inventors: Gerard O'Connor, Galway (IE); Adam Collins, Galway (IE)

(73) Assignee: National University of Ireland, Galway, Galway (IE)

( * ) Notice: Subject to any disclaimer, the term of this patent is extended or adjusted under 35 U.S.C. 154(b) by 160 days.

(21) Appl. No.: 15/560,829

(22) PCT Filed: Mar. 15, 2016

(86) PCT No.: PCT/EP2016/055592
§ 371 (c)(1),
(2) Date: Sep. 22, 2017

(87) PCT Pub. No.: WO2016/150774
PCT Pub. Date: Sep. 29, 2016

(65) Prior Publication Data
US 2018/0111869 A1 Apr. 26, 2018

(30) Foreign Application Priority Data
Mar. 25, 2015 (GB) .................................. 1505042.0

(51) Int. Cl.
*C03B 33/02* (2006.01)
*B23K 26/0622* (2014.01)
(Continued)

(52) U.S. Cl.
CPC ...... *C03B 33/0222* (2013.01); *B23K 26/0624* (2015.10); *B23K 26/0736* (2013.01);
(Continued)

(58) Field of Classification Search
CPC .............. B23K 26/0624; B23K 26/082; B23K 26/0838; B23K 26/083; B23K 26/0736;
(Continued)

(56) References Cited

U.S. PATENT DOCUMENTS 3,932,726 A 1/1976 Verheyen et al.
5,609,284 A 3/1997 Kondratenko
(Continued)

FOREIGN PATENT DOCUMENTS

| CN | 102319958 A | 1/2012 |
| EP | 2 684 635 A1 | 1/2014 |
| KR | 1020130076443 A | 7/2013 |

OTHER PUBLICATIONS

Hermanns,"Laser cutting of glass," International Symposium on Optical Science and Technology, International Society for Optics and Photonics, Oct. 25, 2000, pp. 219-226.
(Continued)

*Primary Examiner* — Joseph S Del Sole
*Assistant Examiner* — Mohamed K Ahmed Ali
(74) *Attorney, Agent, or Firm* — Foley & Lardner LLP

(57) ABSTRACT

Methods and apparatus for cutting a substrate are disclosed. In one arrangement, a plurality of recesses are formed in the surface of the substrate. The recesses as such that a stress can be applied to the substrate that is concentrated by the recesses. The concentrated stress causes the substrate to be cut along a cutting line that passes through the recesses. The cutting occurs via propagation of a crack through the recesses.

18 Claims, 7 Drawing Sheets

(51) Int. Cl.
   *B23K 26/073* (2006.01)
   *B23K 26/364* (2014.01)
   *B23K 26/402* (2014.01)
   *B23K 26/08* (2014.01)
   *B23K 26/082* (2014.01)
   *B23K 101/18* (2006.01)
   *B23K 103/00* (2006.01)

(52) U.S. Cl.
   CPC .......... *B23K 26/082* (2015.10); *B23K 26/083* (2013.01); *B23K 26/0838* (2013.01); *B23K 26/364* (2015.10); *B23K 26/402* (2013.01); *B23K 2101/18* (2018.08); *B23K 2103/54* (2018.08)

(58) Field of Classification Search
   CPC .... B23K 26/402; B23K 26/364; C03B 33/06; C03B 33/0222; C03B 33/095; C03B 33/0955
   See application file for complete search history.

(56) References Cited

U.S. PATENT DOCUMENTS

| | | |
|---|---|---|
| 8,584,490 B2 | 11/2013 | Garner et al. |
| 2010/0247836 A1* | 9/2010 | Kluge ................ C03B 33/0222 428/43 |
| 2013/0126573 A1 | 5/2013 | Hosseini et al. |
| 2015/0097272 A1 | 4/2015 | Jang et al. |
| 2015/0367442 A1* | 12/2015 | Bovatsek ............ C03B 33/0222 65/112 |
| 2016/0009586 A1* | 1/2016 | Bookbinder ............ C03B 33/06 65/112 |

OTHER PUBLICATIONS

Jiao, et al., "Cutting glass substrates with dual-laser beams," Optics and Lasers in Engineering, Jul.-Aug. 2009, vol. 47, Issues 7-8, pp. 860-864.

Kang et al.,"Cutting glass by laser," Second International Symposium on Laser Precision Micromachining, International Society for Optics and Photonics, 2002, vol. 4426, pp. 367-370.

Tsai, et al., "Diamond scribing and laser breaking for LCD glass substrates," Journal of Materials Processing Technology, Mar. 2008, vol. 198, Issues 1-3, pp. 350-358.

Tsai, et al., "Laser cutting of thick ceramic substrates by controlled fracture technique," Journal of Materials Processing Technology, May 2003, vol. 136, Issues 1-3, pp. 166-173.

Tsai, et al., "Laser cutting with controlled fracture and pre-bending applied to LCD glass separation," The International Journal of Advanced Manufacturing Technology, May 2007, vol. 32, Issue 11-12, pp. 1155-1162.

International Search Report and Written Opinion in PCT/EP2016/055592 dated Jun. 30, 2016 (9 pages).

* cited by examiner

METHODS AND APPARATUS FOR CUTTING A SUBSTRATE

CROSS-REFERENCE TO RELATED APPLICATIONS

This application is a U.S. national stage application under 35 U.S.C. § 371(c) claiming the benefit of International Patent Application No. PCT/EP2016/055592, filed Mar. 15, 2016, which claims priority to GB Application No. 1505042.0, filed Mar. 25, 2015, the entire contents of each of which are incorporated by reference in their respective entireties.

The present invention relates to cutting a substrate, in particular a brittle substrate such as a glass. More particularly, the invention relates to cutting a substrate by using a laser to form a plurality of recesses in the substrate and subsequently applying a stress to initiate crack propagation.

Rapid cutting of thin glass is of significant industrial interest due to the growing popularity of touch screen display and photovoltaic applications. Glass has a good chemical resistance, high optical transparency and moderate flexibility for thicknesses below 200 µm. The flexibility of thin glass makes reel-to-reel processing possible, decreasing processing time and material handling issues significantly. The ability to quickly and accurately process thin glass is a key enabling technology for reel-to-reel processes.

Glass can be mechanically cut in a two step scribe and break process as described for example in C. Hermann, *Laser cutting of glass, in: International Symposium on Optical Science and Technology, International Society for Optics and Photonics*, 2000, pp. 219-226. The glass is scribed with a diamond scribe or cutting wheel resulting in a stress induced crack. Force is then applied to the glass to propagate this crack through the entire substrate. Stress raisers are utilised by some mechanical glass cutting wheels. These mechanical cutting wheels have a toothed edge which creates perforations along the surface which act as stress raisers enabling controlled fracture of the substrate. Scribing tools are inexpensive and if used correctly allow high quality cuts to be made in glass as thin as 50 µm. Depending on the requirement the cut glass may require post processing steps to reduce chipping, debris and burrs along the cut edge.

A mechanical cutter is unable cut curved shapes from a glass substrate; scribing is possible only in straight lines. When mechanically scribing thin glass stray breaking will sometimes occur due to the fragile nature of the glass.

For large scale processing in industry the above mechanical scribing technique has generally been replaced by a laser induced controlled fracture technique first introduced by Kondratenko; see V. S. Kondratenko, *Method of splitting non-metallic materials, in, Google Patents*, 1997.

This technique makes use of the fact that the tensile fracture stress of glass is significantly lower than the compressive fracture stress of glass. A glass substrate containing an edge micro-crack is locally heated by a $CO_2$ laser to a temperature just below the glass softening temperature causing compressive stresses in the substrate, insufficient to cause fracture. A coolant jet is subsequently applied to the heated region. Rapid cooling causes the stress to become tensile and induce mode 1 fracture in the glass along the line heated by the laser. Mechanical force is usually required to ensure the crack has propagated through the entire substrate. This method is widely used in industry for processing glass of thickness half a millimetre to several millimetres. Speeds of 0.3 m/s are reported for 1 mm thick soda glass. It is possible to cut curves using this method, but the shape must be closed. While the equipment is significantly more costly than a mechanical cutter the processing speed and cut quality are higher. Other authors have experimented at optimising this process. H.-S. Kang, S.-K. Hong, S.-C. Oh, J.-Y. Choi, M.-G. Song, *Cutting glass by laser, in: Second International Symposium on Laser Precision Micromachining, International Society for Optics and Photonics*, 2002, pp. 367-370 found that a liquid coolant resulted in a faster cutting process but lower edge quality due to the discontinuity of the liquid stream. C.-H. Tsai, B.-C. Lin, *Laser cutting with controlled fracture and pre-bending applied to LCD glass separation, The International Journal of Advanced Manufacturing Technology*, 32 (2007) 1155-1162 showed an improvement in cutting speed and quality by pre bending the substrate.

Controlled fracture techniques combining mechanical laser scribing with laser induced thermal stress to bring about controlled fracture of the glass are known. W. Verheyen, A. Raes, J. P. Coopmans, J. L. Lambert, *Glass cutting, in, Google Patents*, 1976 showed it was possible to cut glass substrates with thicknesses greater than 10 mm. This method involved first scoring the surface with a scoring wheel under a small applied load. The scored line was then heated with a $CO_2$ laser causing fracture along the pre-defined line. C.-H. Tsai, B.-W Huang, *Diamond scribing and laser breaking for LCD glass substrates, Journal of Materials Processing Technology*, 198 (2008) 350-358 achieved similar results using a diamond scribe and $CO_2$ laser. J. Jiao, X Wang, *Cutting glass substrates with dual-laser beams, Optics and Lasers in Engineering*, 47 (2009) 860-864 and C.-H. Tsai, H.-W Chen, *Laser cutting of thick ceramic substrates by controlled fracture technique, Journal of Materials Processing Technology*, 136 (2003) 166-173 investigated dual laser setups where Nd:YAG and $CO_2$ were respectively used to scribe glass followed by a defocused $CO_2$ laser to induce fracture.

It is an object of the invention to provide alternative methods and apparatus for cutting substrates, particularly methods and apparatus that allow processing of thin (e.g. less than 200 micron thick) and/or flexible substrates and/or the provision of curved cuts at arbitrary locations on the substrate.

According to an aspect, there is provided a method of cutting a substrate, comprising: forming a plurality of recesses in a surface of the substrate by laser ablation; and applying a stress to the substrate that is concentrated by the recesses to promote cutting along a cutting line via propagation of a crack through the plurality of recesses.

The inventors have recognised that laser ablation provides a practically realisable, flexible and rapid way of forming stress concentrating recesses in a substrate for cutting of the substrate by a later applied stress. A wider range of features can be cut than is possible using mechanical scribing alternatives. The recesses can be formed more quickly than mechanical scribing alternatives.

In an embodiment, the recesses are distributed non-uniformly along the cutting line (e.g. such that separations between recesses on the cutting line are non-uniform). This can be achieved much more easily using laser ablation than with mechanical scribing alternative. Having the freedom to change the separations between recesses makes it possible to optimise the separations. For example, the recesses may be provided closer together in regions where deviation of a crack away from the cutting line would otherwise be more likely than in other regions. For example, the separations may be made smaller in regions where the cutting line is required to follow tighter curves (i.e. where an average radius of curvature per unit length is lower) than elsewhere. As another example, the separations may be made smaller in regions where there are structures near the cutting line which might concentrate stresses in the cutting line and promote deviation of the crack away from the cutting line.

In an embodiment the laser is configured to form each recess by ablation using a laser beam having the same shape as the recess. The shape of the laser beam here refers to a shape of a cross-section of the laser beam or of a spot formed by the laser beam on the substrate. The shape of the recess is the shape formed by a boundary line marking the interface between the recess and the surface of the substrate. The inventors of found that forming the recesses in this manner is efficient and reliable. Tip regions having small radii of curvature (and hence high levels of stress concentration) can be formed reliably with a low risk of spontaneous crack propagation during the process of forming the recesses.

In an embodiment one or more of the recesses are elongate, thereby concentrating the stress in two opposite regions of the recess. In such an embodiment, the smallest rectangular bounding box containing each of one or more of the recesses has an aspect ratio of 10 or more. Each of one or more of the recesses may be elliptical. A cylindrical lens or elliptical aperture may be used to achieve an elliptical laser beam spot on the substrate for forming elliptical recesses by ablation.

In an embodiment, two or more tip regions in each of one or more of the recesses lie on a straight line which is parallel to a portion of the cutting line passing through the recess. This would be the case for example where an elongate ellipse is aligned with its long axis parallel to the cutting line passing through it. Tip regions aligned with the cutting line in this manner will tend to concentrate stress in such a way as to promote crack propagation along the cutting line.

In an embodiment, two or more of the plurality of tip regions in each of one or more of the recesses are configured to promote crack propagation in two or more respective non-parallel directions. This facilitates efficient cutting of the substrate in a wide variety of geometries. In one example, a recess is configured to promote crack propagation in such a way that three or more of the cutting lines meet at the recess through a corresponding three or more of the tip regions. The recess may have a triangular form for example with three distinct tip regions pointing in the directions of the cutting lines which are intended to meet at the recess.

In an embodiment the cutting line comprises a curved portion. Formation of recesses suitable for cutting along a curved cutting line can be achieved much more efficiently than in mechanical scribing alternatives. The orientation of recesses can be changed quickly and efficiently as the laser ablation laser beam is scanning along the cutting line. In an embodiment the orientation is changed using a spatial light modulator to change the orientation of a laser beam spot on the substrate. This approach provides particular rapid changes in orientation. This approach is particularly desirable where scanning of the laser over the substrate is achieved by moving the laser beam rather than the substrate (e.g. using a galvo-scanner), which can be achieved very quickly. Being able to change the orientation quickly ensures that this part of the process does not, at least significantly, limit the overall speed. The separations between recesses along the cutting line can also be reduced easily, due to the laser ablation approach, to ensure that the crack propagation follows the curved cutting line reliably.

In an embodiment, a plurality of laser beam spots is used in a process for forming the recesses. One or more of the laser beam spots are used to ablate each recess while one or more further laser beam spots cause thermal expansion in the substrate that is such as to reduce the risk of spontaneous crack propagation caused by the one or more spots performing the laser ablation. In one embodiment, the plurality of laser beam spots comprises an ablation spot providing a fluence that is above a laser ablation threshold of the substrate and one or more further beam spots which each provide a fluence that is lower than the laser ablation threshold of the substrate. The one or more further beam spots reduce tensile stresses imparted by the ablation spot in at least a portion of the recess being formed by the ablation spot.

The stress for cutting the substrate can be applied in various ways, including by mechanical or thermal methods. In one embodiment the stress is applied to each of one or more of the recesses by applying a laser spot on each side of the cutting line and scanning the laser spots parallel to the cutting line, thermal contraction in wakes of the laser spots applying the stress to the recesses. This approach allows a thermal stress to be applied in a rapid and highly controllable manner.

In an embodiment, the stress is applied by the laser ablation process itself. The inventors have found this approach to be particularly convenient and does not require additional apparatus. The approach can provide particularly clean fracture. It is thought the stress arises from vapour recoil pressure/thermal stress.

The cutting line will extend along the substrate surface within which the recesses are formed. Typically, the direction of the cutting line defines a direction of propagation of the crack that causes the cutting. The concentration of the stress by the recesses is directed in part or exclusively along the direction of the cutting line. The stress concentration thereby promotes cutting in the direction of the cutting line by propagation of the crack in the direction of the cutting line through the plurality of recesses.

Embodiments of the invention are particularly applicable to cutting thin substrates, for example substrates made from brittle material that is thin enough to be flexible, for example less than 200 microns thick, optionally less than 150 microns thick, for example flexible glass material.

The recesses may be formed on either or both sides of the substrate (e.g. by applying the laser from the respective sides). Providing recesses on both sides has been found to promote particularly clean fracture.

In an aspect of the invention there is provided an apparatus for cutting a substrate, comprising: a laser ablation system configured to form a plurality of recesses in a substrate by laser ablation, and a stress applicator configured to apply a stress to the substrate that is concentrated by the recesses to promote cutting along a cutting line via propagation of a crack through the plurality of recesses.

The invention will be more fully understood by reference to the non-limiting embodiments described below with reference to the figures, in which corresponding reference numerals indicate corresponding parts, and in which.

In embodiments of the invention, as described below with reference to FIGS. 1 to 15, there is provided a method of cutting a substrate 2. The method involves crack propagation along or through the substrate 2. The substrate 2 is preferably brittle when the crack propagation is initiated. Where the substrate 2 is not brittle at room temperature, the substrate 2 may be cooled during the part of the method involving crack propagation.

The method comprises forming a plurality of recesses 4 in a surface of the substrate 2. The plurality of recesses 4 are formed using laser ablation. Laser ablation can provide recesses which act in a similar way to mechanical incisions but can be formed more quickly, more flexibly (e.g. variable position and/or recess shape), and/or reliably. Preferably the laser fluence is controlled to be close to the laser ablation threshold. The inventors have recognised that this approach makes it possible to achieve very low radii of curvature in tip regions 15 of the recesses 4 with a minimal risk of unintended crack initiation. Higher laser fluences will cause higher local heating, which can cause molten flow of substrate material, tending to increase radii of curvature of tip regions 15. Higher local heating will also cause higher tensile stresses on cooling, which increase the risk of crack initiation during the ablation process, which is typically undesirable.

Figure 1:
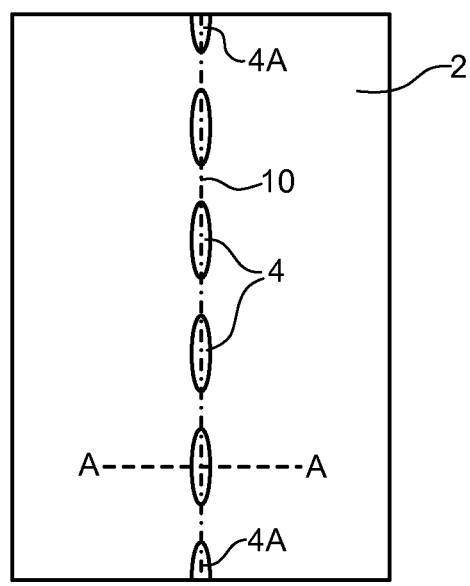
FIG. 1 is a schematic top view of a substrate with a plurality of recesses formed therein.

The substrate 2 is cut by applying a stress (e.g. a tensile stress) at a later time (after the laser ablation process has finished, at least for the particular recess through which it is desired to propagate a crack). The stress causes cutting of the substrate 2 along a cutting line 10. The cutting line 10 is defined by the pattern of recesses 4 formed by the laser ablation (e.g. their positions, shapes and orientations). The cutting along the cutting line 10 occurs via propagation of a crack through the plurality of recesses 4 (e.g. through one recess at a time in sequence). The crack propagation may proceed at least partly in a direction within the local plane of the substrate 2. The crack propagation may in principle be started at any one or more of the recesses 4, but some of the recesses 4 may be more optimal for this purpose than others. For example, where the geometry of the desired cutting line 10 permits, it is often efficient to arrange (e.g. position the recesses and apply a stress to the substrate such) that the crack propagation starts at an edge of the substrate 2. In the arrangement of FIG. 1, crack propagation could be started for example in the lowermost or uppermost recess marked "4A". This could be achieved by pulling laterally outwards on the substrate 2 for example (horizontally outwards in the orientation of the figure), or in other ways. If the stress continues to be applied after initiation of the crack in the lowermost recess 4A, for example, the crack will tend to propagate upwards along the cutting line 10 through all of the other recesses 4 lying along that cutting line 10. In the geometry of FIG. 1, when the crack has propagated completely along the cutting line 10 the substrate 2 breaks apart into two separate pieces.

Figure 2:
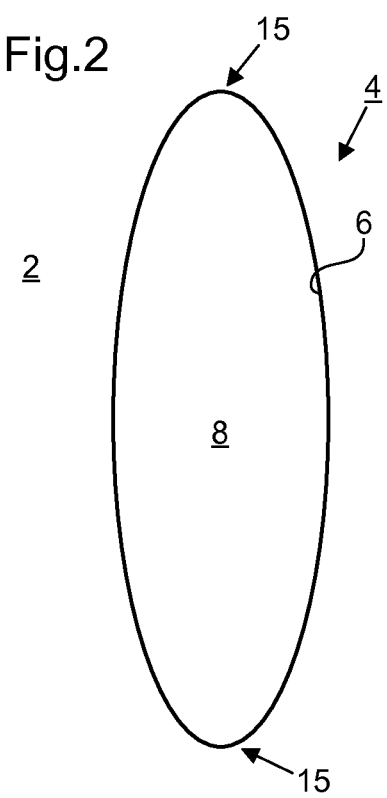
FIG. 2 is an enlarged schematic top view of one of the recesses in FIG. 1.

Each of the recesses 4 has a recess shape that is defined by a closed boundary line 6 marking the interface between each recess 4 and the surrounding surface of the substrate 2 (see FIG. 2 for example). In embodiments of the invention, the recess shape is non-circular, which means that a stress concentration in the substrate 2 caused by the recess 4 will vary non-uniformly along the closed boundary line 6. By arranging for example for the recess shape to have tip regions 15 in which the radius of curvature is lower than elsewhere around the boundary line 6 it is possible to arrange for a stress concentration to be highest where an intended cutting line 10 passes through the recess 4. The stress concentration achieved in the tip region 15 may also be configured to act along a line which is parallel (or identical) to the intended cutting line 10 as it passes through the recess 4. The tip regions 15 correspond to local minima in the radius of curvature of the boundary line 6.

In an embodiment, the recess is elliptical, as shown for example in FIG. 2. In other embodiments the recess may have other shapes.

The base 8 of each recess 4 may be substantially flat (i.e. substantially parallel to a surface of the substrate 2 in the immediate vicinity of the recess 4), as shown in the figures. However this is not essential and the base 8 may be configured to have other forms. For example, the base 8 may be shaped (e.g. by having a downward pointing tip, optionally in a curved shape) so as to promote crack propagation downwards (perpendicular to the cutting line 10).

The laser ablation may be performed in various ways. In one set of embodiments, a laser is configured to form each recess 4 by ablation using a laser beam which is manipulated so as to have the same shape in its cross section as the recess 4 (when the recess is viewed along the direction of incidence of the laser beam). For example, if the recess shape is an ellipse the cross-section of the laser beam would also be an ellipse. This approach makes it possible to form the recesses in a particularly accurate and/or reliable manner.

In a range of embodiments the recess shape of each of one or more of the recesses 4 is elongate. An ellipse is one example of an elongate shape. The degree of elongation may be characterised by reference to the aspect ratio (width: height) of the smallest bounding box which can fully enclose the recess shape. The smallest bounding box for a circle would have an aspect ratio of 1, indicated zero elongation. Higher aspect ratios indicate higher levels of elongation. In an embodiment, the bounding box has an aspect ratio of 3 or more, optionally 5 or more, optionally 7 or more, optionally 10 or more, optionally 15 or more, optionally 20 or more.

In an embodiment, the recess shape of each of one or more of the recesses 4 has plural tip regions 15 (local minima in the radius of curvature of the boundary line 6). A tip region 15 thus corresponds to a portion on the boundary line 6 which has a smaller radius of curvature than at least one other region on the boundary line 6, preferably smaller than an average radius of curvature along the boundary line 6. The tip regions 15 thus act to concentrate stress to a higher degree than other regions on the boundary line 6. In the examples shown in FIGS. 1-4, each of the recesses 4 has two tip regions 15, but in other embodiments more than two tip regions 15 may be provided.

In an embodiment, two or more of the tip regions 15 of each recess 4 lie on a straight line which is parallel to, or identical with, a portion of the cutting line 10 which passes through the recess 4. Aligning the tip regions 15 in this manner encourages propagation of the crack along the cutting line 10.

Figure 3:
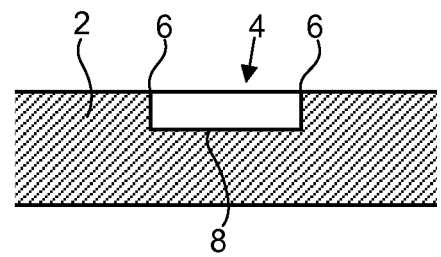
FIG. 3 is a schematic side sectional view along line A-A in FIG. 1.
Figure 4:
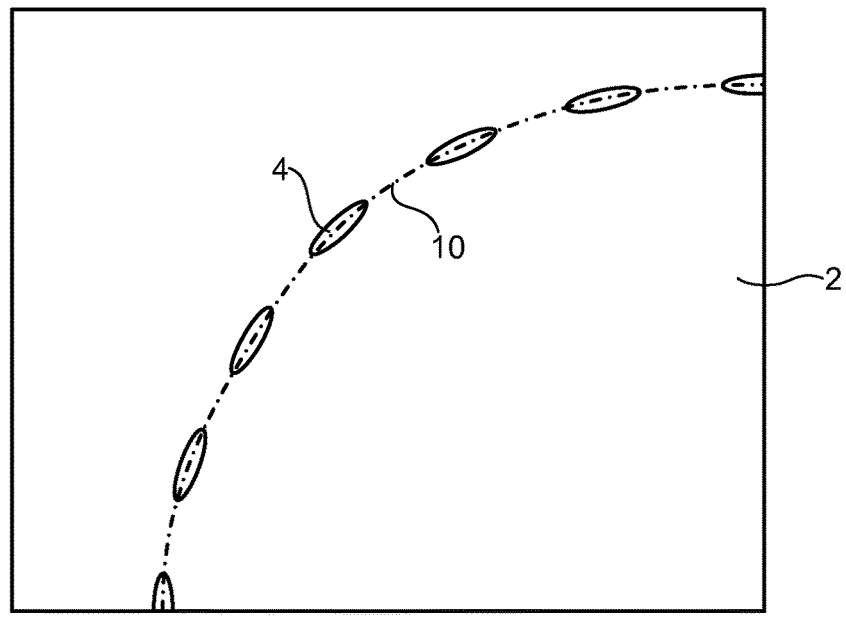
FIG. 4 is a schematic top view of a substrate having a plurality of recesses aligned along a curved cutting line.

In the examples shown in FIGS. 1 to 3 the cutting line 10 is a straight line. This is not essential. In other embodiments the recesses 4 are arranged to encourage crack propagation along a cutting line 10 which comprises at least a portion which is not straight. An example of such an arrangement is shown in FIG. 4. When a stress is induced in this substrate 2 that is sufficient to cause crack propagation along the cutting line 10 the substrate 2 will be cut along a curved line.

In arrangements such as that of FIG. 4 where at least a portion of the cutting line 10 is curved, the orientation of each recess 4 may vary as a function of position along a curved path corresponding to the cutting line 10. This is the case in FIG. 4, for example, where each recess 4 is rotated so as have its two tip regions 15 aligned along the cutting line 10. The variation in orientation of the recess 4 may be implemented in various ways. In one embodiment the substrate 2 is arranged to be rotated during scanning of the ablation laser beam along the curved cutting line 10. Alternatively or additionally, the substrate 2 may be held stationary while the orientation of the laser beam spot is changed as a function of position along the curved cutting line 10. This rotation of the laser beam spot may be implemented by rotating optical elements between a laser source and the substrate or by using a spatial light modulator (such as an array of individually programming optical elements, such as a micro-mirror array, or a deformable mirror such as an MEMS-based deformable mirror) to change the shape of the laser beam spot in a way which is equivalent to changing the orientation of the laser beam spot.

Figure 5:
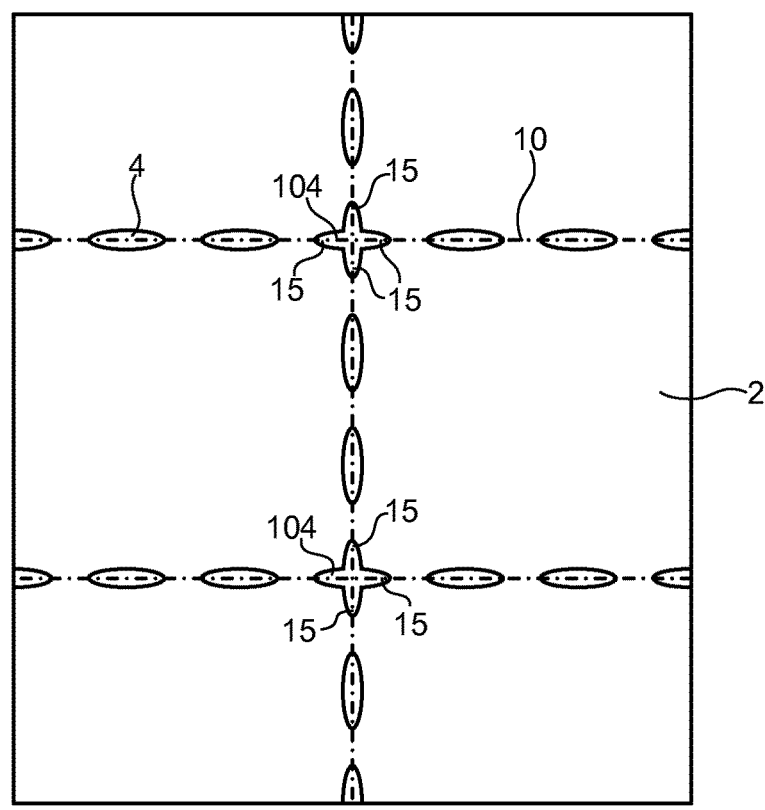
FIG. 5 is a schematic top view of a substrate having recesses with more than two tip regions positioned at intersections between cutting lines.

In an embodiment, the tip regions 15 in each of one or more of the recesses 4 are configured to promote crack propagation in two or more respective non-parallel directions. This may be useful for example where more than two cutting lines meet at a point or where it is required for a cutting line to change direction at a recess 4. An example is shown in FIG. 5 where four cutting lines 10 meet at each of two points of intersection between different cutting lines 10. Two recesses 104 are provided at the points of intersection. Each of the recesses 104 comprises two pairs of tip regions 15 which are each configured to promote crack propagation in two respective non-parallel directions (vertically and horizontally in the orientation shown in FIG. 5). Configuring recesses to promote crack propagation in two or more non-parallel directions facilitates cutting out of complex shapes in a reliable and accurate manner. The approach may be useful for example where a substrate 2 is to be divided into a plurality of separate regions corresponding to different components or devices or different instances or repeating components or devices.

Figure 6:
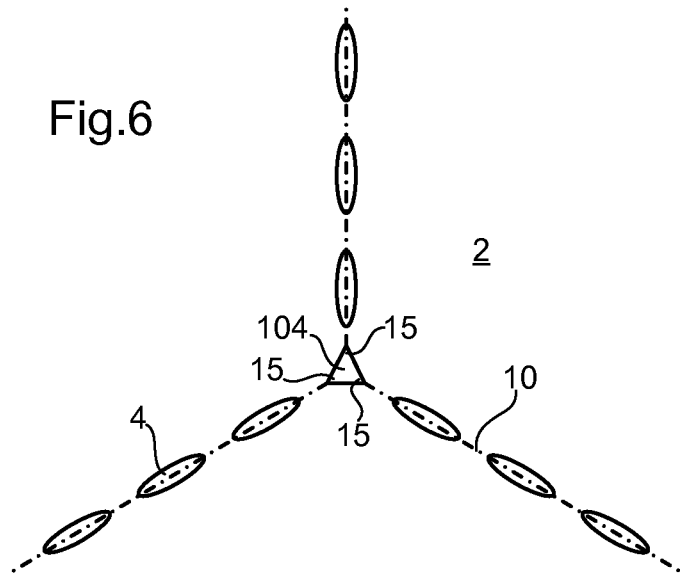
FIG. 6 is a schematic top view of a further example of a substrate having recesses with more than two tip regions.

FIG. 6 shows another example of a configuration having a recess 104 with two or more tip regions 15 configured to promote crack propagation in two or more respective non-parallel directions. In this embodiment the recess 104 is triangular and has three tip regions 15. Each of the tip regions 15 is configured to promote crack propagation in one of three respective non-parallel directions.

Figure 7:
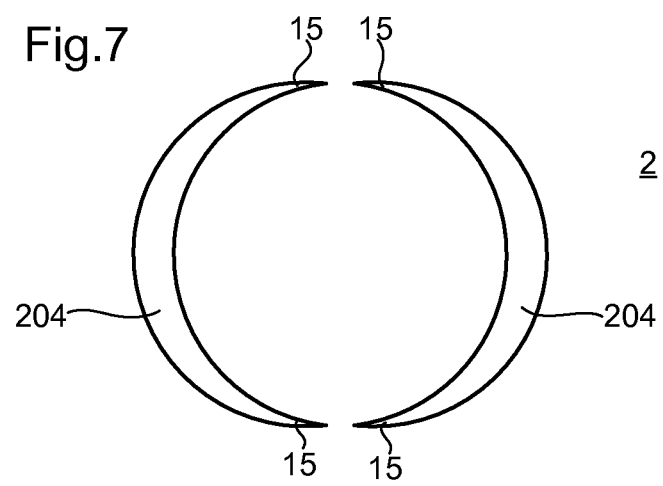
FIG. 7 is a schematic top view of a pair of recesses which each have two tip regions pointing in the same direction.

In an embodiment, an example of which is shown in FIG. 7, two or more of the plurality of tip regions in each of one or more of the recesses 4 point in the same direction. In the example of FIG. 7 two of the tip regions 15 of each the recesses 204 point in the same direction. The two tip regions 15 of the left recess 4 point to the right and the two tip regions of the right recess 4 point to the left. The pair of recesses 4 of FIG. 7 promote crack propagation along a closed, approximately circular cutting line passing through each of the recesses 204 and across the gaps between facing tip regions 15 of the two recesses 4. This arrangement thus allows a hole to be cut out of the substrate 2 using only two recesses 4.

In an embodiment, the recesses 4 are distributed non-uniformly along the cutting line 10. Decreasing the separation between the recesses 4 increases the amount of ablation that is required to form the recesses (more material needs to be removed per unit length of cutting line). This may increase manufacturing costs and/or time. Furthermore, removing more material may make the substrate 2 more fragile, which may be undesirable where the substrate 2 needs to be stored or transported between the laser ablation (recess formation) and substrate cutting (via cracking). However, providing recesses 4 closer together reduces the risk of a crack between neighbouring recesses 4 deviating from the intended cutting line 10 in between the recesses 4. In an embodiment, recesses 4 are made closer together where deviation of a crack away from the cutting line 10 would otherwise (i.e. if the recesses 4 were not closer together) be more likely than in other regions.

Figure 8:
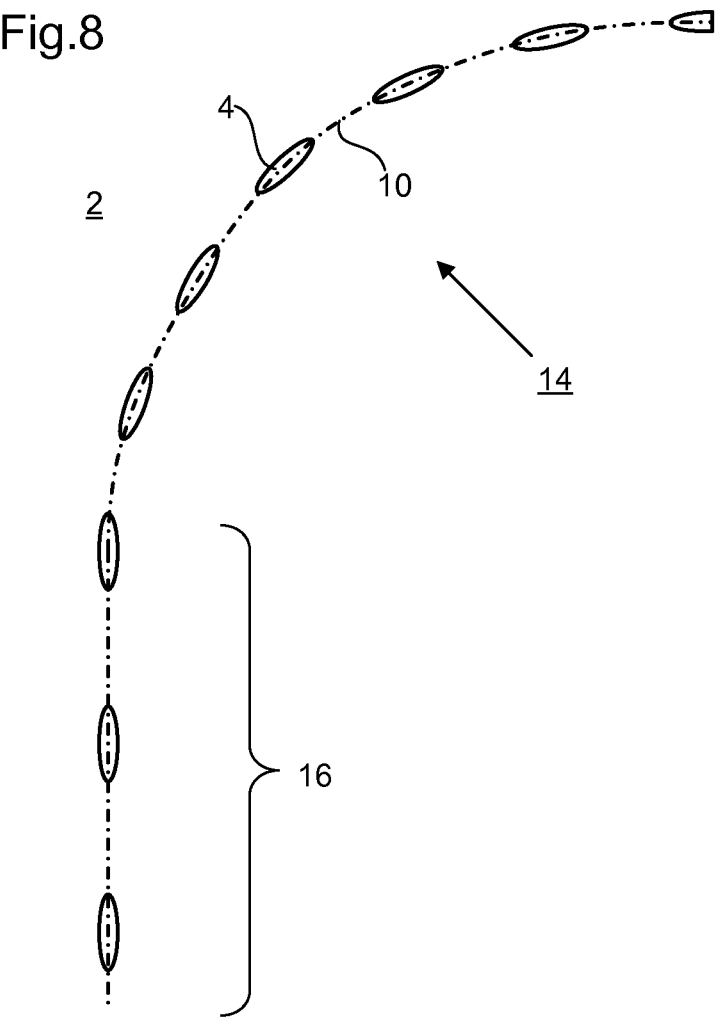
FIG. 8 is a schematic top view of an example plurality of recesses distributed non-uniformly along a cutting line.

In an embodiment, an example of which is shown in FIG. 8, the cutting line 10 comprises a first portion 14 and a second portion 16. The average radius of curvature per unit length (e.g. mean average) of the cutting line 10 is lower in the first portion 14 than in the second portion 16. A lower radius of curvature represents a sharper curve, which typically increases the possibility of a crack deviating from the curve undesirably. In order to reduce this risk the recesses 4 are arranged to be closer together on average (e.g. mean average) in the first portion 14 than in the second portion 16.

Figure 9:
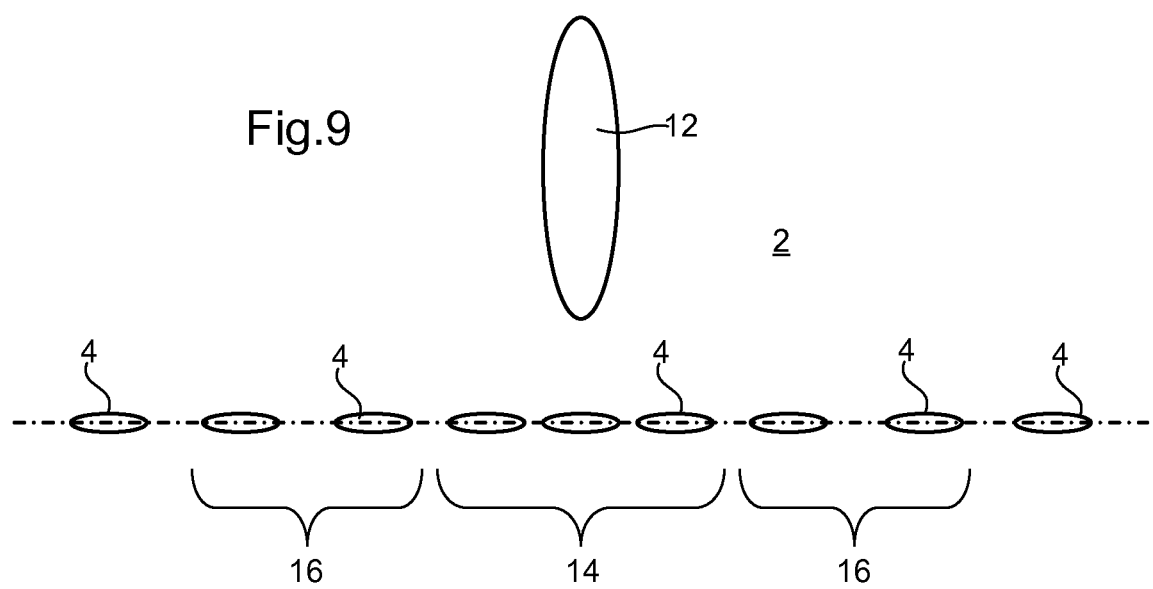
FIG. 9 is a schematic top view of a further example plurality of recesses distributed non-uniformly along a cutting line.

In an embodiment, an example of which is shown in FIG. 9, the cutting line 10 comprises a first portion 14 and a second portion 16. The average stress concentration per unit length of cutting line 10 caused by one or more structures 12 (e.g. a recess, indentation, or hole) in the substrate 2 that do not intersect with the first portion 14 or the second portion 16 is higher in the first portion 14 than in the second portion 16. The recesses 4 are made closer together on average (e.g. mean average) in the first portion 14 than in the second portion 16 to reduce the risk of a crack propagation deviating from the intended cutting line 10 due to the stress concentration caused by the one or more structure 12.

Figure 10:
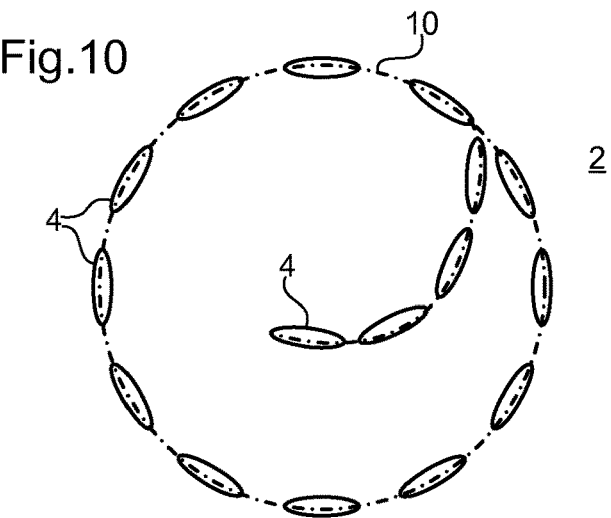
FIG. 10 is a schematic top view of a plurality of recesses arranged along a curved cutting path and configured to allow removal of a circular portion of the substrate.

Crack propagation may occur less predictably in the region where the crack is first initiated in comparison with other regions. This may reduce the quality of the cut in this region. The problem may generally be less pronounced where the crack is initiated from an edge of the substrate 2, such as would be possible in the arrangements discussed above with reference to FIGS. 1 to 5, for example. Where crack initiation is expected to be difficult (e.g. in interior regions of the substrate 2), it may be desirable to initiate cracking in a sacrificial region which will be discarded after completion of the cutting process. An example configuration of this type is shown in FIG. 10. Here, a cutting line 10 is arranged to provide a circular cut out in the substrate 2. The recesses 4 are provided all along the circumference of the circular cutting line 10. However, further recesses 4 are provided which spiral outwardly from an inner, sacrificial region of the circle, in which crack propagation may be initiated.

Crack propagation may be initiated by the laser ablation process itself. This may or may not be desirable. In an embodiment, the geometry of the recesses 4 and/or the properties of the laser beam or beams used during the ablation is/are configured to favour crack propagation in a direction lying along the intended cutting line 10. This may be achieved by using multiple laser beams for example. In one embodiment, a subset (one or more) of the laser beams is configured to perform the laser ablation and a further subset (one or more) is configured to control a stress distribution in the substrate 2 which favours crack propagation in the direction of the cutting line 10 more than crack propagation in any other direction. In this way, if any cracking does start during the laser ablation, the resulting cracks will be more likely to be orientated so as to promote cracking along the intended cutting line when the cutting process is completed later on. Indeed, provided the cracking caused by the laser ablation is not too severe, for example excessively compromising a structural integrity required for storage or transport, the cracking may even be desirable (facilitating the subsequent cutting).

Figure 11:
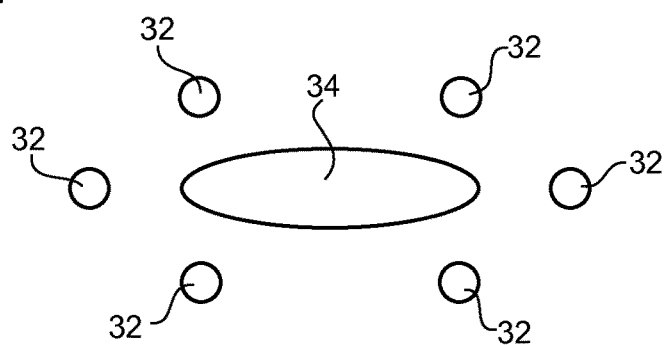
FIG. 11 is a schematic top view of a plurality of laser beam spots for performing laser ablation in such a way as to reduce the risk of spontaneous crack propagation.

In an alternative embodiment, the laser ablation process is configured to disfavour crack propagation during ablation. This may again be achieved by using multiple laser beams for example. In one embodiment a subset (one or more) of the laser beams is configured to perform laser ablation and a further subset (one or more) is configured to control a stress distribution in the substrate 2 in such a way as to reduce tensile stresses applied to tip regions 15 of the recesses 4 during the ablation. FIG. 11 depicts an example configuration of laser beam spots 32, 34 to be used for ablation according to an embodiment. An ablation spot 34 is provided having a fluence that is above the laser ablation threshold. In this example the ablation spot 34 has an elliptical shape to define an elliptical recess. A plurality of further beam spots 32 are provided, each providing a fluence that is below the laser ablation threshold (so as not to cause ablation). The shape and laser properties (e.g. power) associated with the further beam spots 32 are configured to apply heating (which causes thermal expansion) that is such as to reduce tensile stresses imparted by the ablation spot 34 in at least a portion of the recess 4 being formed, for example in tip regions 15 of the recesses 4. In the example shown the further beam spots 32 are circular. This is not essential. In other embodiments the further beam shots may have different shapes, e.g. elliptical.

The stress that is applied for cutting the substrate 2 along the cutting line after the recesses 4 have been formed can be applied in variety of ways.

In an embodiment, a tensile stress is applied using equal and opposite forces applied within the plane of the substrate 2, for example perpendicularly to one or more cutting lines 10 defined by recesses 4 in the substrate 2. Alternatively or additionally, shear stresses may be applied. Equal and opposite forces can be applied perpendicularly to the plane of the substrate 2 and on opposite sides of a cutting line 10 defined by recesses 4 in the substrate 2. Alternatively or additionally, equal and opposite forces can be applied within the plane of the substrate 2 but on opposite sides of a cutting line 10 defined by recesses 4 in the substrate 2.

In a range of embodiments the stress is applied mechanically. The stress may be applied by bending the substrate 2, for example about an axis lying within the plane of the substrate 2, for example an axis parallel to a cutting line 10 defined by recesses 4 formed within the substrate 2.

Figure 12:
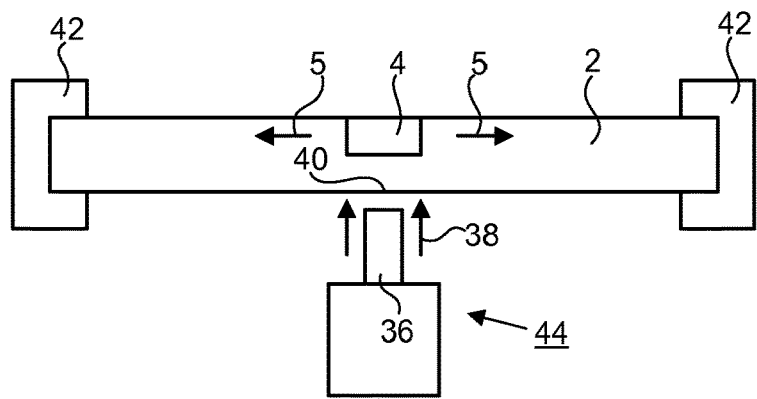
FIG. 12 is a schematic side sectional view of an arrangement for applying a stress mechanically to the substrate for causing crack propagation in the substrate.

In an embodiment, an example of which is shown in FIG. 12, a stress applicator 44 is configured to apply a stress to the substrate 2 by driving 38 a rigid member 36 against a localised region 40 of the substrate 2. A constraining arrangement 42 constrains the substrate 2 such that the pressure provided by the rigid member 36 causes tensile stresses 5 to drive crack propagation along a cutting line 10 defined by recesses 4 in the substrate 2.

In an embodiment, the stress is applied by generating a mechanical resonance in the substrate 2. The mechanical resonance may be generated by applying a periodic force to the substrate 2. The periodic force may comprise a frequency which is the same as or close to a natural resonance frequency of the substrate 2. In an embodiment the mechanical resonance is generated using periodically switching air jets. This approach may be advantageous because it is not necessary to bring any additional apparatus into direct contact with the substrate 2. Alternatively or additionally, the mechanical resonance may be generated by applying acoustic waves to the substrate. Alternatively or additionally, the mechanical resonance may be generated by actuating one or more electrically actuatable elements in contact with the substrate, each electrically actuatable element applying a periodic force to the substrate on actuation. The electrically actuatable elements may comprise piezoelectric devices for example.

In an embodiment the stress is applied by the laser ablation. It is thought the stress from laser ablation arises due to vapour recoil pressure/thermal stress.

In other embodiments the stress is applied thermally.

Figure 13:
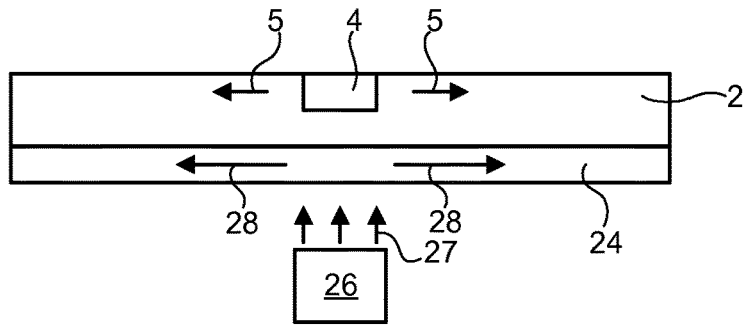
FIG. 13 is a schematic side sectional view of an arrangement for applying a stress thermally to the substrate for causing crack propagation in the substrate.

In an embodiment, an example of which is shown in FIG. 13, the substrate 2 is mounted on or attached to an element 24 (e.g. a PET or metal layer). A heater 26 provides heating 27 to the element 24. Thermal expansion 28 of the element 24 causes a tensile stress 5 to be applied to the substrate 2. The tensile stress 5 causes crack propagation along a cutting line 10 defined by recesses 4 in the substrate 2.

Figure 14:
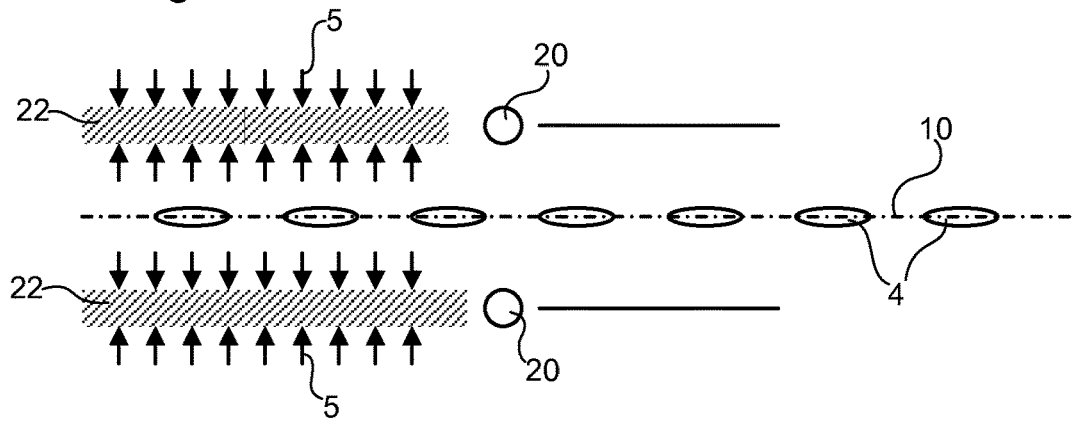
FIG. 14 is a schematic top view showing how a pair of laser spots can be scanned parallel to a cutting line in order to apply a tensile stress to a plurality of recesses arranged along the cutting line.

In an embodiment, an example of which is shown in FIG. 14, the stress is applied thermally using a laser. In an embodiment of this type at least one laser spot 20 is applied on each side of a cutting line 10 passing through the recesses 4 to which the stress is to be applied. The laser spots 20 are scanned parallel to the cutting line 10. The laser spots 20 heat the substrate 2 locally which causes expansion of the substrate 2. The substrate 2 then cools in the wakes 22 of the laser spots leading to contraction of the substrate 2. The contraction applies a tensile stress 5 to the recesses 4 in between the wakes 22, leading to crack propagation along the cutting line 10.

The substrate 2 has a front side and a back side. In an embodiment, the plurality of recesses comprises recesses on the front side only. In an embodiment, the plurality of recesses comprises recesses on the back side only. In an embodiment, the plurality of recesses comprises recesses on both of the front side and the back side of the substrate.

Figure 15:
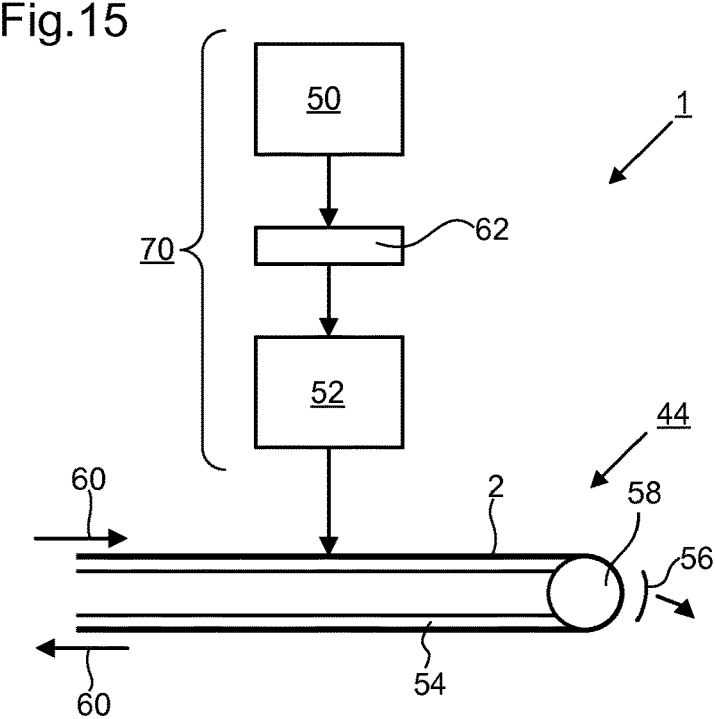
FIG. 15 is a schematic side sectional view of an apparatus for cutting a substrate.

FIG. 15 shows an example apparatus 1 for cutting a substrate 2 according to one or more of the embodiments discussed above, or other embodiments. The apparatus 1 comprises a laser ablation system 70 configured to form the plurality of recesses 4 in the substrate 2 by laser ablation. In the particular arrangement disclosed the laser ablation system 70 comprises a laser source 50 (e.g. an ultrashort pulse laser), a spatial light modulator 62 for shaping the laser beam spot as required (e.g. to provide a cylindrical shape), and a projection system 52 for projecting a suitably shaped laser beam spot onto the substrate 2. The apparatus 1 further comprises a stress applicator 44 configured to apply a stress to the substrate 2 that is concentrated by the recesses 4 to promote cutting along a cutting line 10 via propagation of a crack through the plurality of recesses 4. In the particular example shown, the stress applicator 44 comprises an endless belt 54 configured to convey (arrows 60) a flexible (e.g. thin glass) substrate 2 to be processed. The substrate 2 is driven around a roller 58 which bends the substrate 2 and provides a tensile stress to the substrate 2. The tensile stress causes crack propagation along a cutting line 10 in the substrate 2, leading to removal of desired portions 56 of the substrate 2. As discussed above, many other ways of applying stress to the substrate 2 may be employed for initiating the crack propagation.

Figure 16:
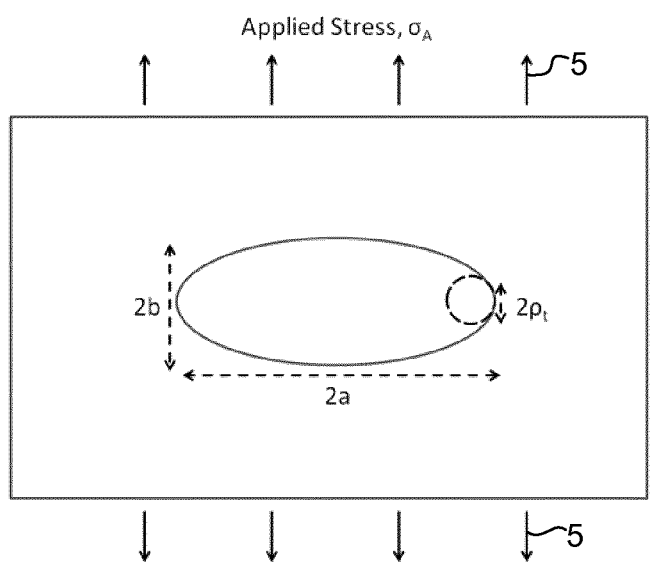
FIG. 16 depicts application of a stress to a substrate containing an elliptical recess.

The recesses 4 discussed above promote propagation of the crack through the recesses by concentrating stresses applied to the substrate in the vicinity of tip regions 15. The concentrated stress is preferably directed along the intended cutting line 10. Stress concentration per se is known in the art. For example, the stresses around an elliptical hole in a brittle plate which is placed under uniform applied tension were mathematically determined by C. Inglis. He showed that stresses at the tip of ellipses and sharp corners can be enlarged significantly relative to stress elsewhere in the plate. FIG. 16 depicts an elliptical hole in a plate with major and minor axes of 2a and 2b respectively and a uniform applied stress of $\sigma_A$. To analyse the effect of the hole on the stress distribution in the plate Inglis assumed that Hooke's law is valid everywhere in the plate, the hole boundary is stress-free to begin with, the dimensions a and b are small relative to the size of the plate and b is much smaller than a. Inglis arrived at an expression for the stress concentration factor, K, at the tip of the ellipse where the radius of curvature is at a minimum. The following simplified expression for K is obtained using the geometric condition for ellipses that $p_t = b^2/a$:

$$K = 2\sqrt{(a/\rho_t)} = 2a/b$$

It is clear that for a narrow ellipse the stress concentration factor can become significant.

Further Details of Non-Limiting Example Practical Implementations

In specific practical implementations of the above embodiments, ultrashort pulse lasers (e.g. lasers with pulse durations of much less than 1 ps, for example of the order of 1 fs) were used to form the recesses 4. A feature of ultrashort pulse lasers is the ability to reach the high intensities required for non-linear absorption in glass at moderate pulse energies and highly localised energy deposition. This facilitates formation of recesses 4 with low radii of curvature in the tip regions 15 and low risk of unwanted crack initiation during ablation. Sub-micron ablation precision is possible with femtosecond pulses due to the absence of thermal effects and deterministic damage threshold. Combining an ultrashort pulse laser with a CNC scanning system (for moving the substrate) allows complex features to be quickly and precisely machined.

In one example, recesses 4 were formed using an Amplitude Systemes s-Pulse laser with a wavelength of 1030 nm and a pulse duration of 500 fs. The laser had a Gaussian beam profile with a nominal propagation factor $M^2 < 1.2$. The laser emitted a linearly polarised beam. The laser power was varied using the built in laser attenuator which consisted of a motorised half-wave plate and a linear polariser. The laser was incident on the sample from above and laser scanning was achieved by moving the stage. The glass used was 130 μm thick alkali free borosilicate glass.

The focusing optics required to achieve the desired spot size were determined using optical ray tracing software (Zemax 12 S/N 33293). A telescopic optical arrangement comprising a spherical bi-convex lens (f=100 mm) and a cylindrical lens (f=50 mm) was used. The lenses were mounted inside a telescopic lens tube permitting a variety of focused spot dimensions depending on lens separation. The design was advantageous over an aspheric one due to its versatility, cost effectiveness and the use of in stock optical components. A short working distance, ~15 mm, means debris extraction is desirable to prevent contamination of the objective lens. The Rayleigh length of the configuration was approximately 0.4 mm. When necessary the lens tube arrangement was rotated by a CNC rotary stage (Aerotech MPS-GR50). Elliptically shaped recesses 4 were percussion drilled in the substrate 2 at each desired location.

During percussion drilling of the recesses 4 it was found that spontaneous fracture occurs for irradiation of 5 k pulses or more per recess 4. The stress generated in the percussion drilling process along with the stress concentration at the tip regions 15 of the recesses 4 are sufficient to cause fracture of the substrate 2. Conjoined fracture occurs even with spot separation as high as 1 mm. The spontaneous fracture tends to deviate from the cutting line 10 defined by the recesses 4, leaving a jagged edge. Stray fracture was eliminated in the particular configuration used by reducing the number of pulses for each recess 4 to 50. This also prevented any spontaneous fracture occurring between the recesses 4. An additional processing step was required to apply sufficient tensile stress to the substrate 2 to cause fracture (crack propagation) along the cutting line 10 defined by the recesses 4.

Curved scribes were made in glass by rotating the cylindrical lens along the arc of the curve while the sample stage moved in a circular arc. The long axis of the ellipse was parallel to the tangent of the curve at every point. Spot separation was constant throughout the curve. The sample was fractured using mechanical force. With this method it was possible to process glass with radii of curvature as low as 5 mm. To ensure consistent fracture along the curved parts of the shape 300 pulses per spot were used.

It was found that fracturing along curved cutting lines 10 could be achieved precisely using a $CO_2$ laser and coolant to induce tensile stress and fracture along the cutting line defined by the recesses 4.

Polarisation of the incident laser is an important consideration when processing transparent materials with ultrashort pulse lasers. The polarisation state of the laser determines the transmission coefficient through the walls of the feature being ablated. For P polarisation this coefficient is higher and for a high number of pulses damage to the rear surface of the substrate 2 is possible. The damage is caused by incubation and the formation of colour centres.

In an example a galvo scanner is used to scan the laser over the substrate 2 for ablating the recesses 4. This approach is quicker than scanning the substrate 2 relative to a stationary laser beam spot. Focusing in such an arrangement may be achieved by an F theta lens. An f=1000 mm cylindrical lens may be used. With this configuration it was possible to form elliptical recesses 4 with slightly larger dimensions than the fixed lens setup. Crucially the delay time between each recess 4 due to stage movement is virtually eliminated. The galvo scanner had a field of view of 75 mm. Recesses 4 defining a cutting line 10 line along the full length of the field of the view were formed to test for aberrations. It was found that the recesses 4 were almost identical.

To scribe curved cutting lines it is desirable for the recesses 4 to be rotated to follow the arc of the cutting line at every point. This can be achieved by rotating the (recess shaped) laser spot or rotating the substrate 2 relative to the laser spot. In the present example a lens tube was fixed to a CNC rotary stage allowing synchronised control between an XYZ movement stage and a rotary stage to provide the required movement of the substrate 2. The required rotation between points depends on the radius of curvature of the desired cutting line 10. The pulses per spot was increased to 300 for curved parts to prevent deviation of the crack from the desired path during fracture. Processing speed on curved parts is reduced significantly, in this particular example, to 1.6 mm/s. This is due partly to the low rotation speed of the rotary stage (23 deg/s) and the increased dwell time per spot (30 ms). For a 5 mm radius of curvature the rotation between spots is 5.1° requiring a jump time of 0.22 s. Cut quality on curved parts is similar to straight sections. Depending on the shape two or more mechanical fractures are required to remove the scribed part from the bulk substrate.

Galvo scanners improve jump speeds by a factor of 50. Galvo scanners can achieve scanning speeds of 3.5 m/s and have a step response time of 0.4 ms. This compares favourably to the movement stage which has a maximum speed of 70 mm/s and a non-negligible acceleration time. High speed rotation of the laser spot to complement the high galvo scanner speed can be achieved with additional optoelectronic equipment. For example air bearing rotary stages are available with rotation speeds of 4800 deg/s. A spatial light modulator can be used to provide one dimensional focusing and also rapid rotation of the beam shape.

The invention claimed is:

1. A method of cutting a substrate, comprising:
   forming a plurality of recesses in a surface of the substrate by laser ablation; and
   applying a stress to the substrate that is concentrated by the recesses to promote cutting along a cutting line via propagation of a crack through the plurality of recesses,
   wherein the recess shape, defined by a boundary line of an opening of the recess at the surface of the substrate, of each of one or more of the recesses is non-circular, such that a radius of curvature of the boundary line varies along the boundary line, and the recess shape further has plural tip regions, each tip region being defined as a local minimum in the radius of curvature of the boundary line at the surface of the substrate, and
   wherein the laser ablation is performed with a laser fluence controlled so that no molten flow of substrate material occurs in the tip regions.

2. The method of claim 1, wherein the recesses are distributed non-uniformly along the cutting line.

3. The method of claim 2, wherein the recesses are closer together in regions where deviation of a crack away from the cutting line would otherwise be more likely than in other regions.

4. The method of claim 2, wherein:
   the cutting line comprises a first portion and a second portion;
   an average radius of curvature per unit length is lower in the first portion than in the second portion;
   the recesses are closer together on average in the first portion than in the second portion.

5. The method of claim 2, wherein:
   the cutting line comprises a first portion and a second portion;
   an average stress concentration per unit length caused by one or more structures in the substrate that do not intersect with the first portion or the second portion is higher in the first portion than in the second portion; and
   the recesses are closer together on average in the first portion than in the second portion.

6. The method of claim 1, wherein the laser is configured to form each recess by ablation using a laser beam having the same shape as the recess.

7. The method of claim 1, wherein a smallest rectangular bounding box containing each of one or more of the recesses has an aspect ratio of 3 or more.

8. The method of claim 1, wherein each of one or more of the recesses is elliptical.

9. The method of claim 1, wherein two or more of the plurality of tip regions in each of one or more of the recesses lie on a straight line which is parallel or identical to a portion of the cutting line passing through the recess.

10. The method of claim 1, wherein two or more of the plurality of tip regions in each of one or more of the recesses are configured to promote crack propagation in two or more respective non-parallel directions.

11. The method of claim 10, wherein three or more of the cutting lines meet at the recess through a corresponding three or more of the tip regions.

12. The method of claim 1, wherein the cutting line comprises a curved portion.

13. The method of claim 1, wherein the forming of the plurality of recesses comprises forming at least one recess by simultaneously irradiating a portion of the substrate where the recess is to be formed with a plurality of laser beam spots, the plurality of laser beam spots comprising an ablation spot providing a fluence that is above a laser ablation threshold of the substrate and one or more further beam spots which each provide a fluence that is lower than the laser ablation threshold of the substrate, the one or more further beam spots being configured to reduce tensile stresses imparted by the ablation spot in at least a portion of the recess being formed by the ablation spot.

14. The method of claim 1, wherein:
   the laser is scanned over the substrate to produce the plurality of recesses; and
   the orientation of a laser spot formed by the laser is changed as a function of position when the laser is scanned over the substrate along a curved path, thereby changing the orientation of recesses formed by the laser spot in correspondence with the curved path, wherein, optionally, the orientation of the laser spot is changed using a spatial light modulator, the spatial light modulator optionally comprising a micro-mirror array or deformable mirror.

15. The method of claim 1, wherein the stress is applied mechanically, by bending the substrate, by driving a rigid member against a localised region of the sheet, or by the laser ablation.

16. The method of claim 1, wherein the stress is applied by generating a mechanical resonance in the substrate, the mechanical resonance being optionally generated using periodically switched air jets, by applying acoustic waves to the substrate, or by actuating one or more electrically actuatable elements in contact with the substrate, each electrically actuatable element applying a periodic force to the substrate on actuation.

17. The method of claim 1, wherein:
the stress is applied thermally; and either:
the substrate is mounted on or attached to an element and the element is heated, thermal expansion of the element applying the stress to the recesses; or
the stress is applied to each of one or more of the recesses by applying a laser spot on each side of the cutting line and scanning the laser spots parallel to the cutting line, thermal contraction in wakes of the laser spots applying the stress to the recesses.

18. The method of claim 1, wherein the cutting line extends along said substrate surface and the concentration of the stress by the recesses is directed at least along the cutting line, thereby promoting cutting along the cutting line via propagation of a crack in the direction of the cutting line through the plurality of recesses.

* * * * *